3,265,533
PROCESS FOR PRODUCING DEXTROSE

Harry Meisel, Englewood, N.J., assignor to Corn Products Company, New York, N.Y., a corporation of Delaware
No Drawing. Filed Sept. 11, 1963, Ser. No. 308,084
9 Claims. (Cl. 127—38)

The present application is a continuation-in-part of copending application Serial No. 133,566, filed August 24, 1961, now abandoned.

This invention relates to a new and improved method for obtaining crystalline alpha-dextrose hydrate from dextrose containing liquors, particularly, such as are produced by the enzymic hydrolysis of starch.

The main object of the invention is to provide a method for crystallizing alpha-dextrose hydrate from dextrose containing liquors whereby the crystallization is effected substantially instantaneously.

Another object is to provide a process for crystallizing dextrose hydrate whereby the large number of costly crystallizers now in commercial use may be completely eliminated.

A further object is to eliminate the use of the considerably large number of centrifuges used to separate the dextrose crystals from the mother liquor.

Still a further object is to provide a process for producing crystalline dextrose from the aforementioned liquors wherein the entire dextrose liquor is crystallizd without formation of mother liquor, thereby eliminating purging and centrifuging the crystals, reprocessing the mother liquor for additional yield of dextrose and various other modifications of these steps.

Yet another object is to provide a process for substantially the simultaneous crystallization and agglomeration of dextrose hydrate.

Another object is to provide a process for substantially the simultaneous crystallization and agglomeration of dextrose hydrate and the drying of the agglomerates. Other objects will appear hereinafter.

It is known and recognized that dextrose can exist in three crystalline forms, the alpha hydrate form, the alpha anhydrous form, and the beta anhydrous form. The alpha anhydrous and beta anhydrous forms are developed from supersaturated solutions of dextrose at elevated temperatures whereas the hydrate form is unique in that it only forms from supersaturated solutions at relatively low temperatures. The alpha anhydrous crystals and beta anhydrous crystals can be formed in a relatively short time whereas the hydrate form, which is commercially useful, takes a long time to grow. The temperature at which dextrose hydrate crystallization begins in a hot supersaturated solution of dextrose having the proper moisture content is shown by Frank E. Young, J. Phys. Chem. 61, 616–619 (1957). He gives the transition point between hydrate and anhydrous dextrose as 54.7° C. and the percent dextrose as 73.22, working with chemically pure dextrose solutions. However, in commercial practice the starch hydrolysates contain small amounts of non-dextrose substances which modify the transition point; therefore, it is preferable to designate a transition range which, in this case, lies between about 50° C. to about 55° C.

The commercial process for producing dextrose hydrate developed by W. B. Newkirk, in the early 1920's, and known as crystallization in motion is still in use today. The basic principles of this process are set forth in U.S. Patents 1,471,347; 1,508,569 and 1,521,830. The object of this process was to obtain crystals, designated as purgeable crystals, from which the hydrol or mother liquor could be removed readily by centrifuging and washing.

Since the starch hydrolysate liquor made by the acid hydrolysis of starch contains non-dextrose constituents, which are objectionable from the standpoint of taste and for other reasons, it was necessary to use the technique of crystallization as a purification step in the process to obtain pure dextrose. The Newkirk contribution was an improvement on this technique.

Although Newkirk provided a highly improved process over the art at that time, and, as mentioned, his method is still in use today, it does have certain disadvantages. Among these are the long periods of time required for crystallization, necessitating a large capital investment for equipment and housing. For example, in commercial practice, the average crystallizing time required to form the dextrose hydrate from the dextrose containing liquor is between 96 and 120 hours. Thus, it will be apparent a large number of crystallizers are required for any large scale operation. Further, a substantial number of centrifuges are needed to separate the crystals from the mother liquor, necessitating still further capital investment. The time and labor required for filling and emptying the crystallizers and operating the centrifuges, as well as for maintenance of such equipment, of course, adds more to the cost of operating present commercial systems. Moreover, there is also an in-plant sanitation problem which increases the cost still more. It will be readily apparent that there is a need and desire to provide a more simple and more economical process for obtaining dextrose hydrate.

The present invention provides a process for preparing crystalline dextrose hydrate from a dextrose containing liquor by rapidly cooling a solution supersaturated with respect to dextrose and containing between about 70 and about 90% of dry substance and having a temperature in the range of about 50° C. to about 70° C. The solution is cooled by mixing it rapidly and intimately with a bed of dextrose crystals having a temperature markedly lower than about 50° C., whereby spontaneous formation of microcrystals of dextrose hydrate in said solution occurs.

In one embodiment of the present invention, a solution, supersaturated with respect to dextrose and containing about 70% to about 90% of dry substance, and at a temperature above or within the transition temperature range for the formation of dextrose hydrate crystals, is cooled rapidly by mixing it rapidly and intimately with a bed of dextrose crystals consisting predominantly of dextrose hydrate crystals, said bed having a markedly lower temperature than the transition temperature range at which the hydrate crystal form is initiated.

In another embodiment of the present invention, a solution, supersaturated with respect to dextrose and containing about 70% to about 90% of dry substance, and at a temperature of about 50° C. to about 70° C., is cooled rapidly by intimate mixing with a crystal bed consisting predominantly of alpha anhydrous dextrose crystals, said bed having a temperature less than about 50° C., whereby spontaneous formation of microcrystals of dextrose hydrate occurs.

For all practical purposes, the resultant microcrystalline product should be dried to the usual moisture content of commercial dextrose hydrate, e.g., 8 to 10 percent. When the drying step is contemplated, it should be carried out substantially immediately after the formation of the microcrystals.

The crystal bed may be wet or dry, but since a dry product is the desired end product, it is preferable generally to use a dry crystal bed. Optionally, the process of my invention may be modified to produce substantially simultaneously the instantaneous crystallization of dextrose hydrate and the agglomeration of the resulting crystals in clusters or agglomerates. For example, the supersaturated solution is atomized upon a violently agitated crystal bed whereby the newly formed microcrystals are fused and agglomerated into clusters or large particles. The hydrate crystals or agglomerates thereof should be dried immediately as a continuing step in the process by any conventional drying means to the desired moisture content, for example, to 8 to 10 percent for most commercial uses. In addition to dextrose hydrate crystals and alpha anhydrous dextrose crystals, beta anhydrous dextrose crystals may be used to form the crystal bed.

The prior art and commercial practice have always sustained a view that the rate of crystallization of the hydrate form of dextrose is very slow. No doubt, this view is correct as concerns the formation of large purgeable hydrate crystals. In contrast to the large crystals obtained by present practices, my method produces microcrystals. In practising my invention, I take advantage of the fact that dextrose hydrate does crystallize in microcrystalline form. The entire commercial production of dextrose hydrate today is in the form of large, purgeable crystals made available as a result of Newkirk's contribution.

In practising my invention, I also take advantage of the fact that there is now available a starch hydrolysate or dextrose liquor obtained by the enzymic hydrolysis of starch which is sufficiently pure to permit the entire hydrolysate to be crystallized directly. Thus, mother liquors and further processing steps to produce maximal yields of dextrose hydrate crystals are eliminated.

As will be seen from the description set forth herein, I operate my process at a supersaturation high enough to permit the entire crystallization of the dextrose hydrate to occur in what is known in the art as the shock or labile zone of spontaneous crystallization. In contrast, the success of the present commercial process for the production of dextrose hydrate resides in the fact that the entire crystallization for the production of purgeable crystals lies wholly in the metastable zone or zone in which only existing crystals can grow.

I am aware that mixing dextrose containing liquors with dextrose seed beds has been proposed (see U.S. Patents 2,369,231 and 2,854,359). However, the processes illustrated were designed for the anhydrous form of dextrose and there is no teaching of the present invention which involves forming microcrystalline dextrose hydrate by spontaneous nucleation. In other words, the microcrystals of dextrose hydrate formed by the present invention create or may contain their own nuclei. Hence, it is within the scope of the present invention to use beta anhydrous dextrose crystals, alpha anhydrous dextrose crystals, dextrose hydrate crystals, or mixtures thereof to form the bed which serves as the solid particulate medium for the spontaneous crystallization of the dextrose solution.

The dextrose liquor, which may be used in my invention, should be supersaturated with respect to dextrose and contain sufficient moisture to permit the hydrate crystals to form. In addition, it should not be so viscous that it would impede crystallization. A dextrose liquor having a dry substance content of about 70 to about 90 percent is satisfactory. The liquor to which the invention is particularly applicable is the hydrolysate obtained by the enzymic hydrolysis of starch. Such liquors have concentrations of dextrose in the range of about 91 percent to about 100 percent on the dry basis, and any non-dextrose constituents present are free from objectionable flavor and color. Of course, pure dextrose solutions made by dissolving pure dextrose may be used but these would not be economical at the present time. Acid hydrolysates of starch are not as suitable because they contain appreciably lower concentrations of dextrose and more objectionable non-dextrose constituents.

The crystallization is preferably carried out on a continuous basis and various types of equipment are satisfactory. For example, a screw conveyor operated at a speed sufficiently rapid to produce a violently agitated crystal bed may be used to accomplish the crystallization. Or the crystal bed may be located on a vibrating conveyor and the liquor sprayed thereon. Fluid beds may be used wherein the crystal bed is sustained in violent motion pneumatically (for example, by air) and allowed to come into contact with dextrose containing liquor in atomized form. This latter method permits crystallization and agglomeration, as well as drying the agglomerates in a single unit.

The crystal bed at the beginning of the process should consist, preferably, of predominately dry dextrose crystals. By "dry," I mean containing no moisture in excess of that permitting easy handling. A practical range is about 8 to 10 percent. Various ratios of crystal bed to liquor can be employed. From an economical standpoint, it is desirable to keep the amount of crystals in the bed at a minimum. Dextrose hydrate crystals from the finished product may be used to form a crystal bed for crystallization of another dextrose solution.

The temperature of the liquor to be crystallized may be any temperature above or within the transition range of about 50° C. to about 70° C. For all practical purposes the temperature of this liquor should not be lower than about 50° C. The temperature of the crystal bed should be sufficiently low to induce rapid, spontaneous crystallization without the production of a viscous mixture which would impede the free crystallization of dextrose hydrate. The temperature of the crystal bed will depend somewhat on the amount of liquor it is required to cool and induce rapid, spontaneous crystallization therein. For example, the less liquor to be cooled, the higher the temperature of the crystal bed and vice versa for a given temperature of the liquor. A practical temperature range for the crystal bed is 20° C. to 35° C. If temperatures below 15° C. for the crystal bed are used, there may be a reduction in the rate of crystallization due to the development of extraordinarily high viscosity of the liquor, which impedes crystallization.

The advantages of my invention over prior art processes are readily apparent. The process can be carried out in a very short time and on a continuous basis with a minimum of equipment. The product may be obtained in several forms, e.g., powdered or agglomerated, which can be packed and shipped with ease.

The following examples which are typical and informative only and are not to be interpreted as in any manner limiting, will further illustrate my invention.

*Example I*

A first draw liquor obtained by hydrolyzing starch first with acid to a D.E. of 18 to 20 and then with a saccharifying enzyme was crystallized in accordance with the principles of my invention. The liquor had a D.E. of 94 percent and a density of 39° Bé. 7.5 kilograms of the liquor, at a temperature of 67° C. was atomized continuously onto 20 kilograms of a violently agitated crystal bed consisting of dextrose hydrate crystals (D.E. of 99.9 percent), at a rate of 7–8 kilograms per hour. The temperature of the crystal bed was 27–29° C. The bed was sustained in violent agitation by an air current at 25° C. The ratio of crystal bed to dextrose liquor, on a dry substance basis, was 3.3 to 1. The resultant product consisted of agglomerates of dry, free flowing microcrystalline dextrose hydrate. This was dried immediately after its formation by a continuous stream of hot air at 50° C. until the moisture content was reduced to .8 percent.

*Example II*

Example I was repeated except the crystal bed (20 kilograms) had a D.E. of 98 percent and the ratio of crystal bed to dextrose liquor (14.5 kilograms) on a dry substance basis, was 1.7 to 1 and the rate was 5 kilograms per hour.

The product obtained was substantially identical to that obtained by the method of Example I.

*Example III*

In this example wet crystals were used to form the crystal bed. It was formed by agitating for a prolonged period of time a dextrose containing liquor made by enzymic hydrolysis of starch as described in Example I, said liquor having a D.E. of 95 percent and a density of 42° Bé. The crystals thus formed were substantially a white viscous fondant like material consisting almost entirely of microcrystalline dextrose hydrate. The crystal bed was maintained in a flight conveyor type mixer at a temperature of about 26° to 32° C. A clear dextrose containing solution at 42° Bé. and a D.E. of 95 percent and at a temperature of 54–55° C. was added to one end of the mixer. The rate of flow through the mixer was one gallon per minute. The clear added solution was immediately transformed to a white microcrystalline fondant like mass coming to equilibrium with the orginal crystal bed which was substantially all dextrose hydrate crystals. Mixing was continued until the product became granular.

I claim:

1. A process for preparing microcrystalline dextrose hydrate from a dextrose containing liquor which comprises cooling rapidly a solution, consisting essentially of dextrose and containing between about 70 and about 90 percent of dry substance, and having a temperature in the range of about 50° C. to about 70° C. to a temperature below about 50° C. by mixing said solution rapidly and intimately with a bed of dextrose crystals having a temperature markedly lower than about 50° C. to spontaneously crystallize dextrose hydrate from said solution, maintaining said temperature below about 50° C. and thereby obtaining microcrystalline dextrose hydrate as the product.

2. A process according to claim 1 wherein the microcrystals of dextrose hydrate are dried immediately after their formation.

3. A process according to claim 1 wherein said dextrose crystals are predominantly alpha anhydrous dextrose crystals.

4. A process according to claim 1 wherein said dextrose crystals are predominantly beta anhydrous dextrose crystals.

5. A process for crystallizing dextrose hydrate from a dextrose containing liquor which comprises rapidly cooling a solution, consisting essentially of dextrose and containing about 70% to about 90% of dry substance, and having a temperature in the range of about 50° C. to about 70° C., to a temperature below about 50° C. by mixing said solution rapidly and with violent agitation with a crystal bed consisting essentially of dextrose hydrate crystals having a temperature markedly lower than about 50° C. to spontaneously crystallize dextrose hydrate from said solution, maintaining said temperature below about 50° C., thereby obtaining microcrystalline dextrose hydrate as the product, and immediately thereafter drying said microcrystals of dextrose hydrate.

6. Process according to claim 5 wherein the solution consisting essentially of dextrose is cooled rapidly by atomizing it upon a violently agitated crystal bed.

7. Process according to claim 5 wherein a drying atmosphere is introduced into the area wherein the atomized solution and crystal bed meet.

8. Process according to claim 5 wherein the said solution is obtained by the enzymic hydrolysis of starch and has a dextrose concentration about 91 to about 100 percent, dry basis.

9. A process for crystallizing dextrose hydrate from a dextrose containing liquor which comprises rapidly cooling a solution consisting essentially of dextrose and containing about 70 to about 90% dry substance, and having a temperature in the range of about 50° C. to about 70° C., to a temperature below about 50° C. by atomizing said solution upon a crystal bed consisting essentially of dextrose hydrate crystals having a temperature markedly lower than about 50° C., to spontaneously crystallize dextrose hydrate from said solution, maintaining said temperature below about 50° C. thereby obtaining microcrystalline dextrose hydrate as the product, said crystal bed being sustained in violent motion by means of air, and immediately thereafter drying said microcrystals of dextrose hydrate.

References Cited by the Examiner

UNITED STATES PATENTS

| | | | |
|---|---|---|---|
| 2,046,567 | 7/1936 | Lund | 127—58 X |
| 2,369,231 | 2/1945 | Harding | 127—60 X |
| 2,854,359 | 9/1958 | Wilson et al. | 127—30 |

MORRIS O. WOLK, *Primary Examiner.*

M. E. ROGERS, *Assistant Examiner.*